Nov. 8, 1932.  D. T. OWEN  1,887,215
SPRING FORMING AND ASSEMBLING MACHINE
Filed Sept. 20, 1929  15 Sheets-Sheet 1

INVENTOR
D. T. OWEN.

ATTORNEY

Nov. 8, 1932.  D. T. OWEN  1,887,215

SPRING FORMING AND ASSEMBLING MACHINE

Filed Sept. 20, 1929   15 Sheets-Sheet 4

INVENTOR
D. T. OWEN.
BY
ATTORNEY

Nov. 8, 1932.  D. T. OWEN  1,887,215
SPRING FORMING AND ASSEMBLING MACHINE
Filed Sept. 20, 1929  15 Sheets-Sheet 8

INVENTOR.
D.T.OWEN.
BY
ATTORNEY

Nov. 8, 1932.  D. T. OWEN  1,887,215

SPRING FORMING AND ASSEMBLING MACHINE

Filed Sept. 20, 1929   15 Sheets-Sheet 12

D. T. OWEN. INVENTOR
ATTORNEYS.

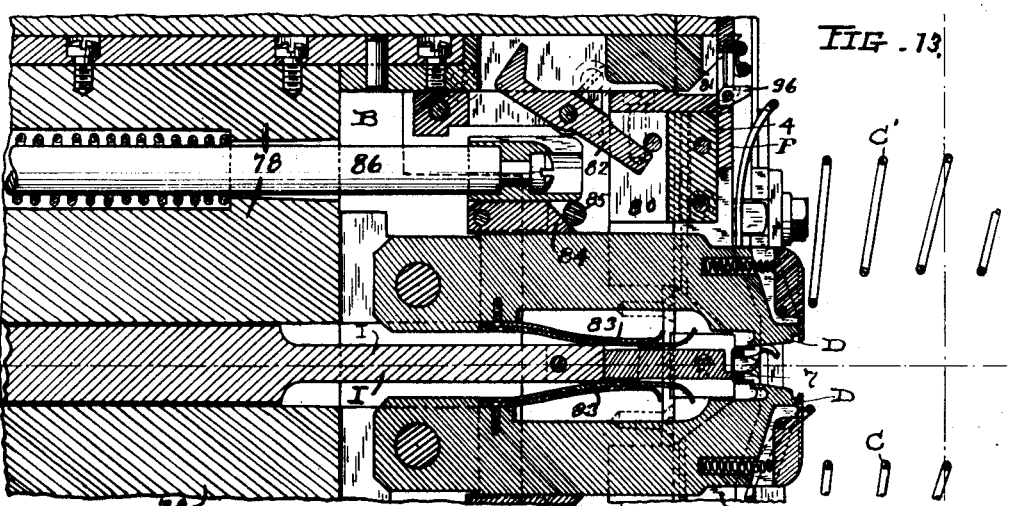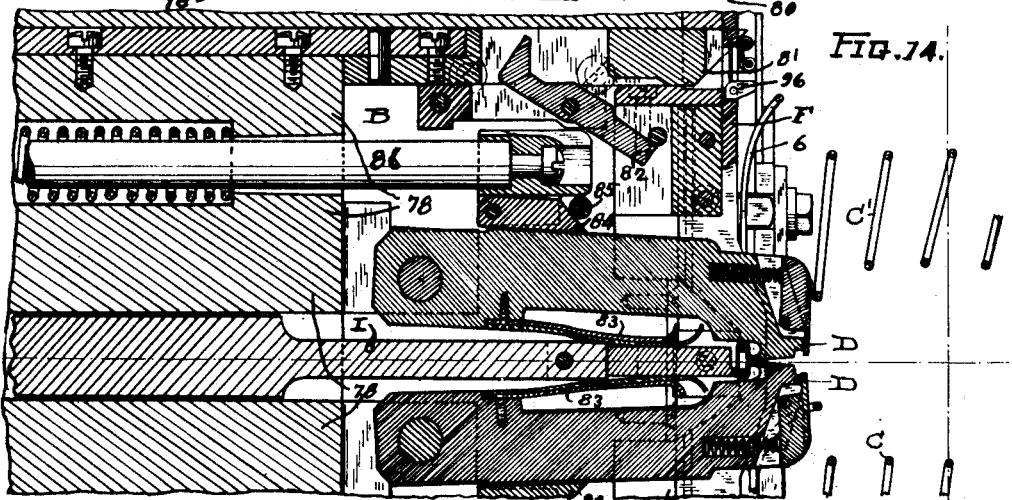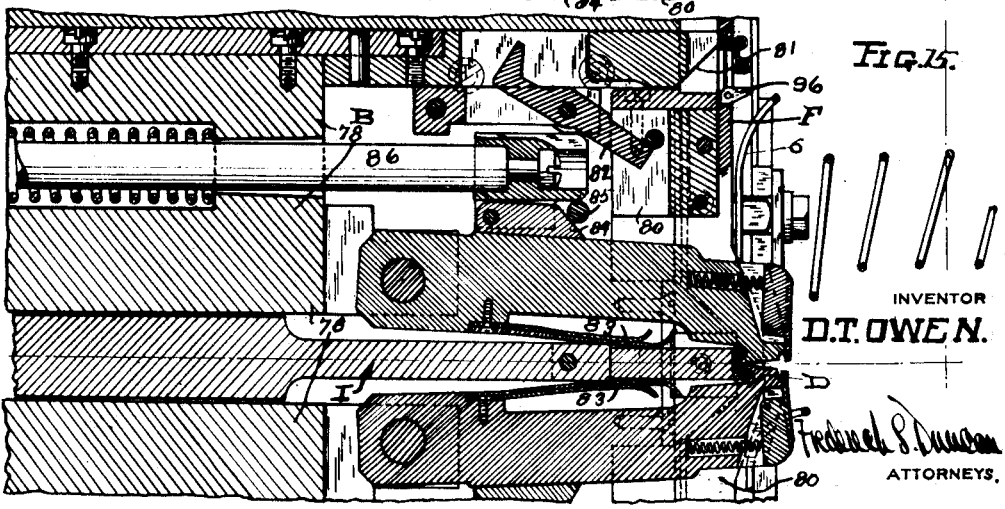

Nov. 8, 1932.  D. T. OWEN  1,887,215
SPRING FORMING AND ASSEMBLING MACHINE
Filed Sept. 20, 1929    15 Sheets-Sheet 14
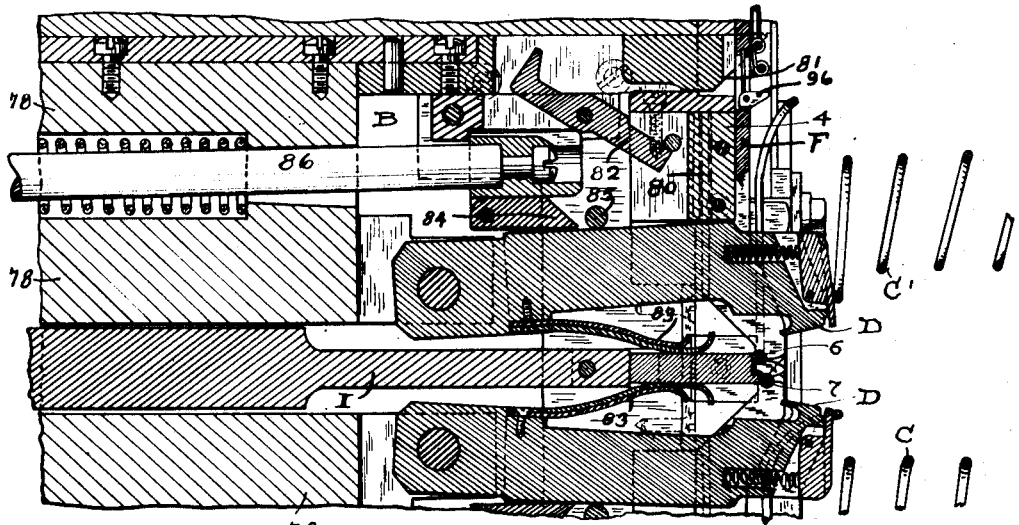
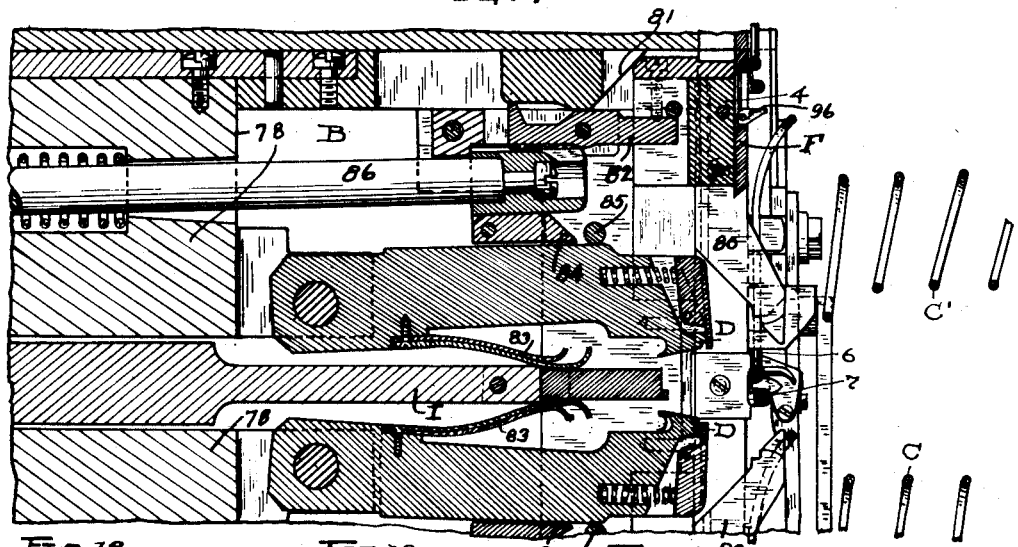
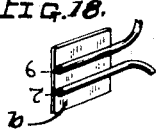 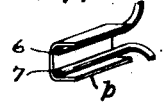 
 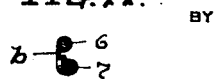
INVENTOR
D.T. OWEN
BY
ATTORNEY Nov. 8, 1932.  D. T. OWEN  1,887,215
SPRING FORMING AND ASSEMBLING MACHINE
Filed Sept. 20, 1929  15 Sheets-Sheet 15
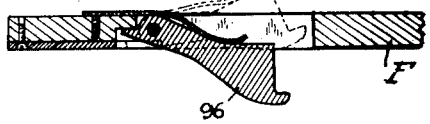
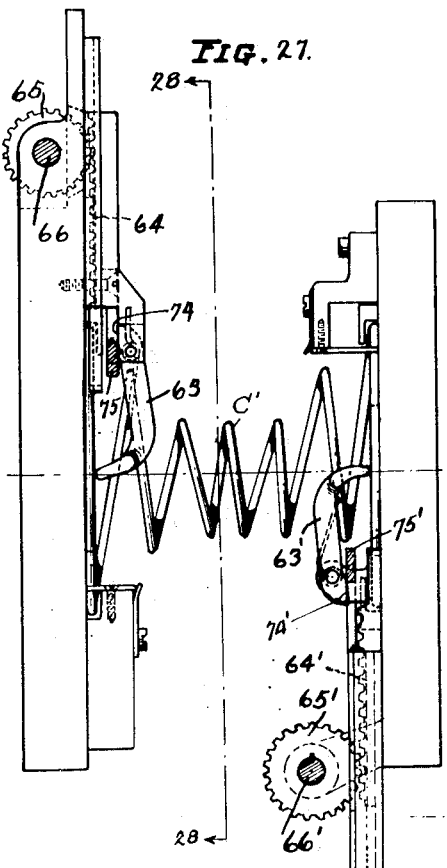
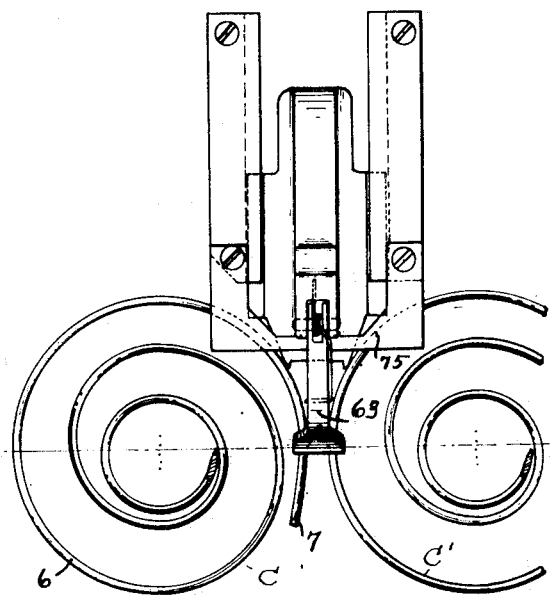
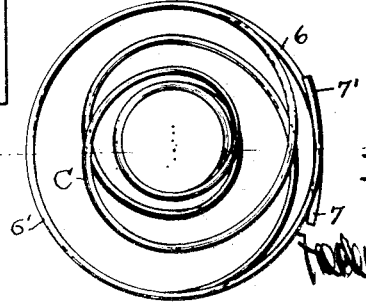
INVENTOR
D. T. OWEN
ATTORNEY Patented Nov. 8, 1932

1,887,215

UNITED STATES PATENT OFFICE

DAVID T. OWEN, OF CLEVELAND, OHIO, ASSIGNOR TO THE OWEN AUTOMATIC SPRING MACHINERY COMPANY, OF CLEVELAND, OHIO, A CORPORATION OF OHIO

SPRING FORMING AND ASSEMBLING MACHINE

Application filed September 20, 1929. Serial No. 393,919.

The present invention pertains to automatic apparatus for producing spring structures, and more particularly to a machine for producing an elongated structure composed of a series of coiled wire springs united together in a straight row.

The present apparatus is an improvement on the machine shown and described in my application filed on the 12th day of March 1929, Serial No. 346,306, wherewith coiled wire springs are formed singly and successively and then clipped together successively but at one end only. The present apparatus, on the other hand, is designed to produce in rapid succession coiled wire springs of uniform length and size, and also to connect the opposite ends of each spring to the corresponding ends of a second spring as rapidly as the springs are produced. To effect that general purpose the apparatus includes a spring coiling machine, and two clipping machines, together with means located between them to handle, control and direct the movement and position of the coiled springs at both ends thereof, having in mind that a coiled spring is a vibratory body difficult to maintain within bounds and under control, especially when both ends of the spring have free flexing extremities as in the present instance.

Manifestly, the objects of the invention are many and varied, all as hereinafter set forth and as will appear in the following detailed description: Thus, in the accompanying drawings, Figure 1 is a side elevation on a greatly reduced scale, of the automatic apparatus for producing spring structures;

Figs. 13, 14, 15, 16 and 17 are sectional views corresponding to Fig. 12 in part, and showing one set of clipping devices in different operating positions from the beginning to the finish of a connecting operation;

Figs. 18, 19, 20, and 21 are perspective views illustrating the folding movement of a blank around two spring wires, including indenting of the blank and one wire.

Fig. 22 is a cross sectional view of the complete clip on line 22—22 of Fig. 21;

Fig. 23 is a side elevation of one of the feed plates for the spring;

Fig. 24 is a sectional view of the same taken on the line 24—24 of Fig. 23;

Fig. 25 is an enlarged sectional view taken on line 25—25 of Fig. 23, showing the construction of one of the feed pawls carried by the plate;

Fig. 26 is a sectional view of one of the feed pawls located on the longitudinal median line of the plate;

Figs. 27 and 28 are end and side views, respectively, of the clamping devices for the spring, Fig. 28 being taken on section line 28—28 of Fig. 27; and Fig. 29 is an end view of a coiled spring having overlapping terminal portions at opposite ends thereof lying in the same plane at the same side of the spring.

Figure 5:
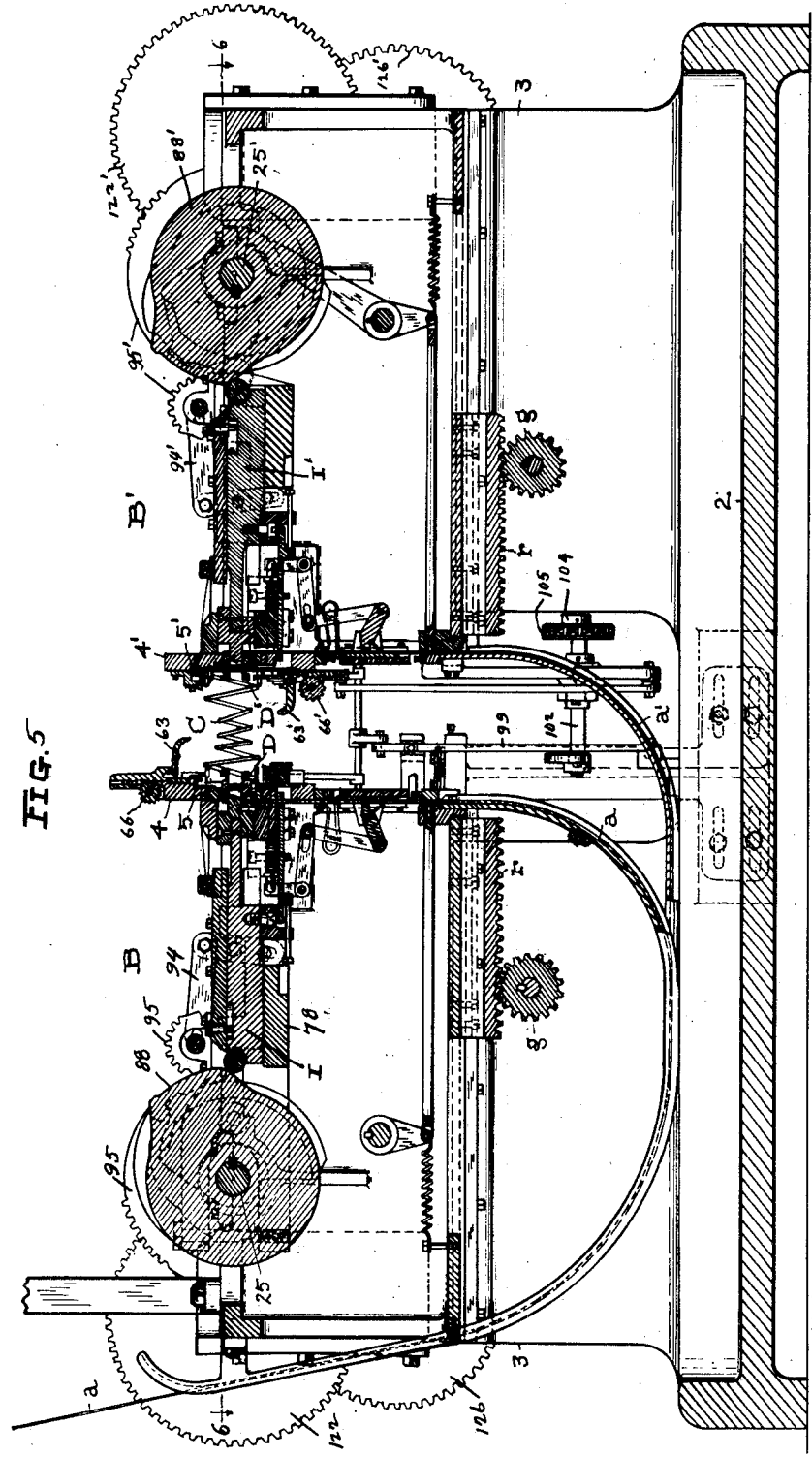
Fig. 5 is a view in longitudinal section on a vertical plane through the apparatus, the section being taken on line 5—5 of Fig. 2.
Figure 8:
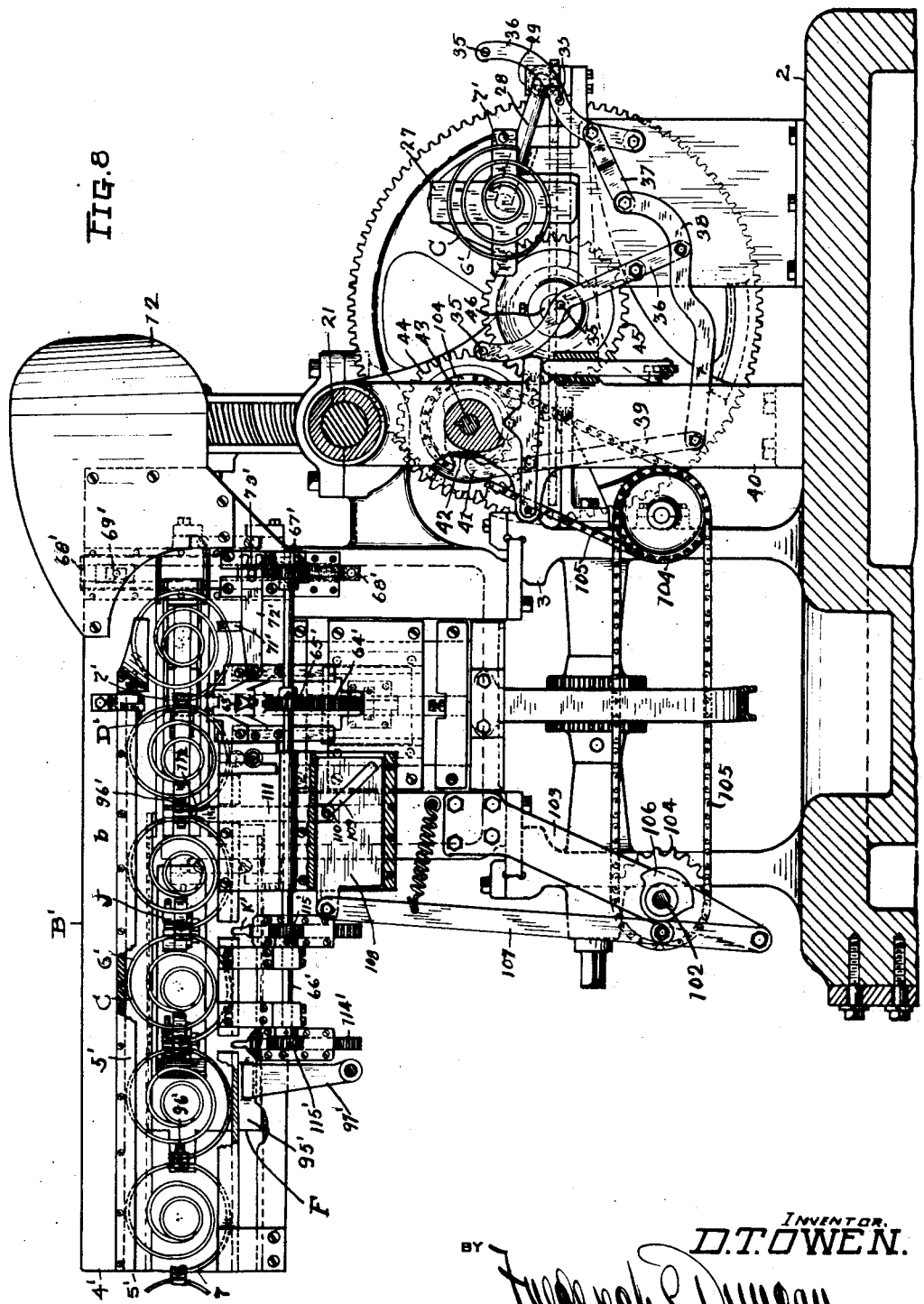
Fig. 8 is a cross section taken on the same section line 7—7, but looking in an opposite direction, or to the right.

The present apparatus comprises a spring coiling machine A and a pair of spring clipping machines B—B', geared cooperatively together to produce a row of connected springs C. The clipping machines B—B' are in the main constructed alike and arranged horizontally opposite each other, end to end, upon a bed plate 2, preferably on elevated tracks 3 to permit them to be moved or shifted longitudinally in respect to each other so that their working heads may be spaced apart varying distances to operate on springs of different length. Any suitable means, such as racks $r$ and gears $g$, (Fig. 5) may be employed to shift the two machines on their tracks. The working heads of the machines include two plates 4—4' adapted to seat the opposite ends of the springs and also adapted to be moved back and forth in respect to each other to facilitate clipping operations and feed movements of the springs. These plates extend a substantial distance beyond the discharge sides of the two clipping machines to support a row of springs, and the end coils 6—6' at the opposite ends of the springs are guided and move in a straight line within parallel channels or guide-ways 5—5' in the plates (Fig. 8).

Figure 9:
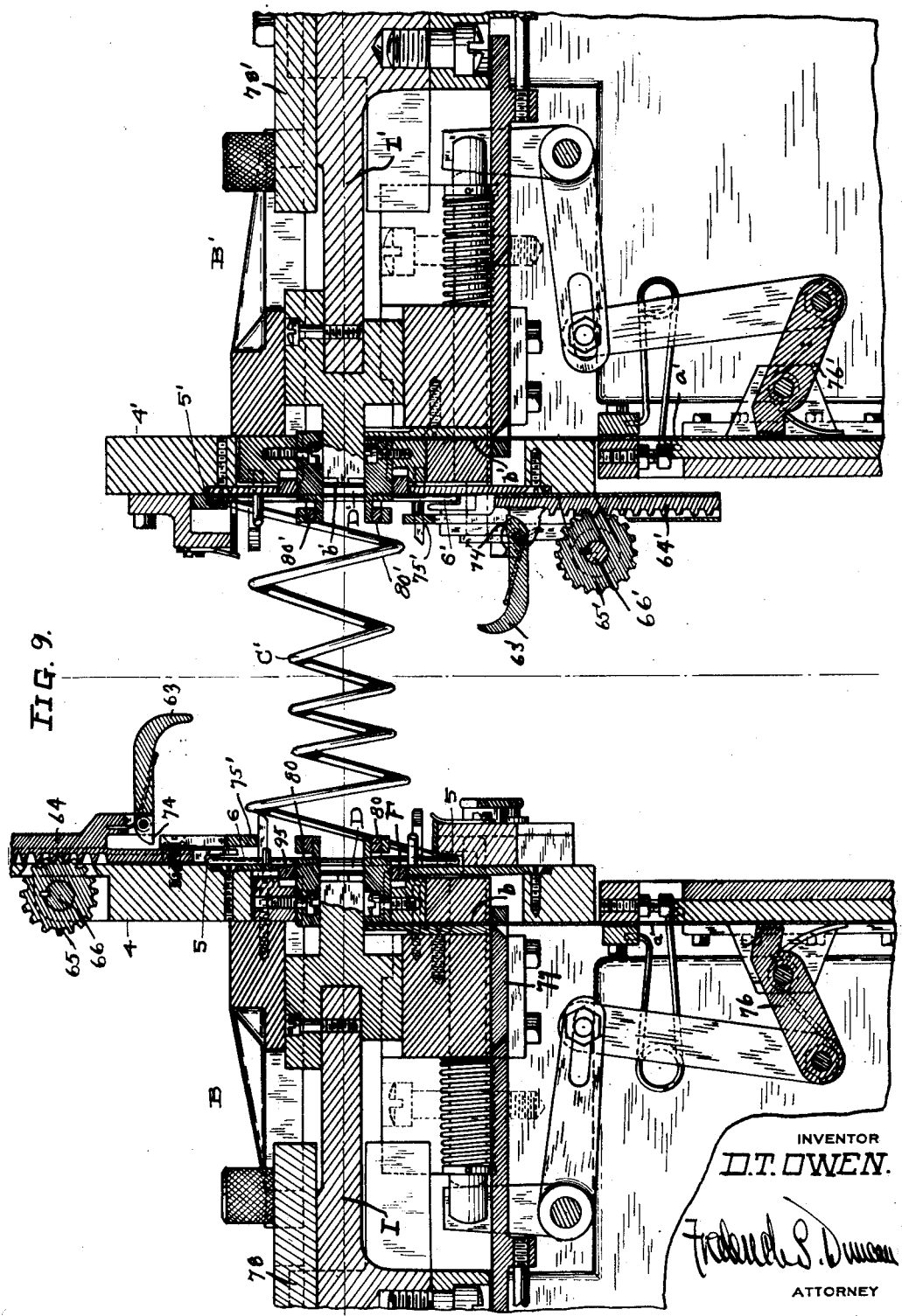
Fig. 9 is a fragmentary sectional view corresponding to Fig. 5, and showing the working heads of the two clipping machines on an enlarged scale.
Figure 10:
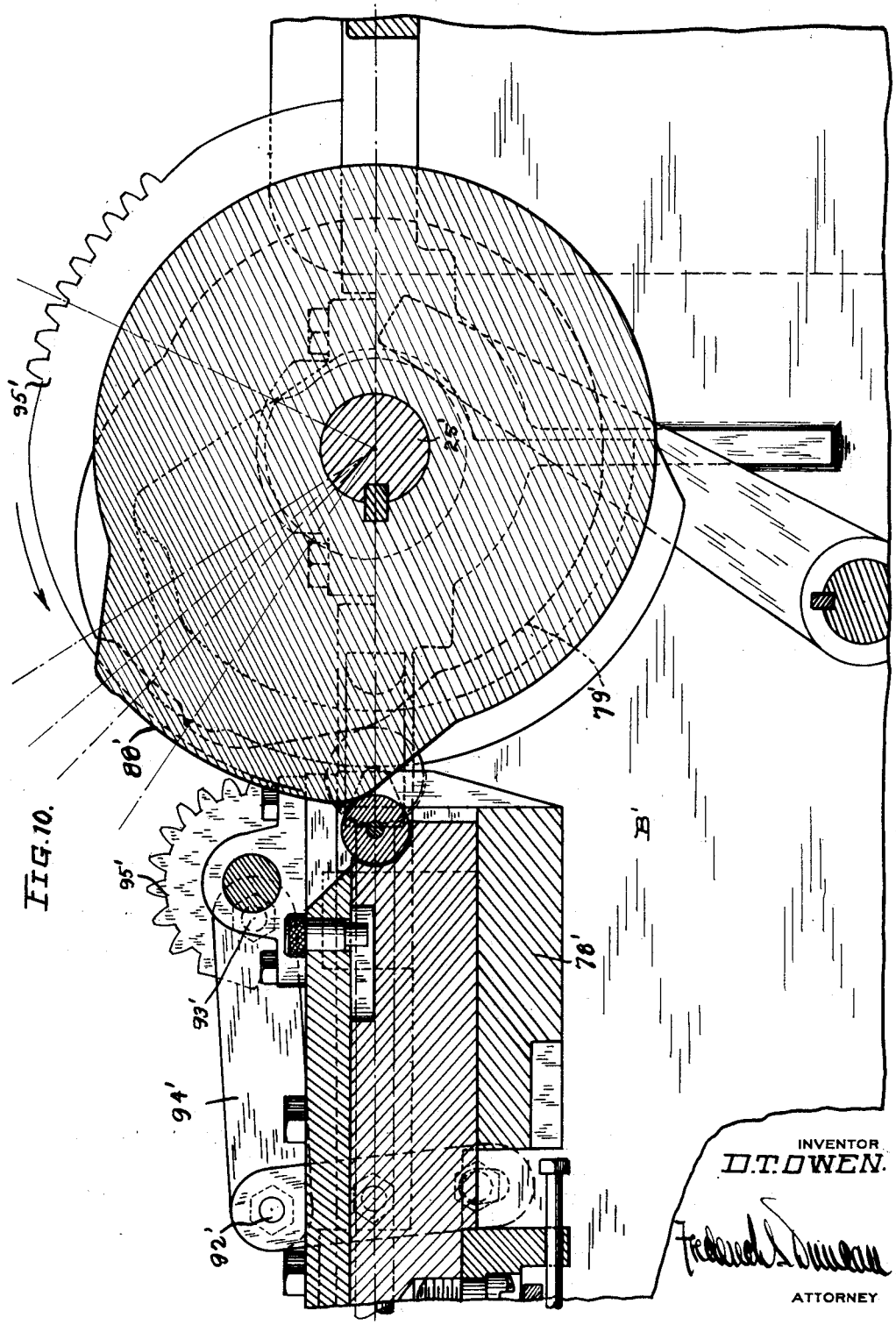
Fig. 10 is a fragmentary sectional view corresponding to Fig. 5, showing the operating cams at one end of a clipping machine on an enlarged scale.
Figure 11:
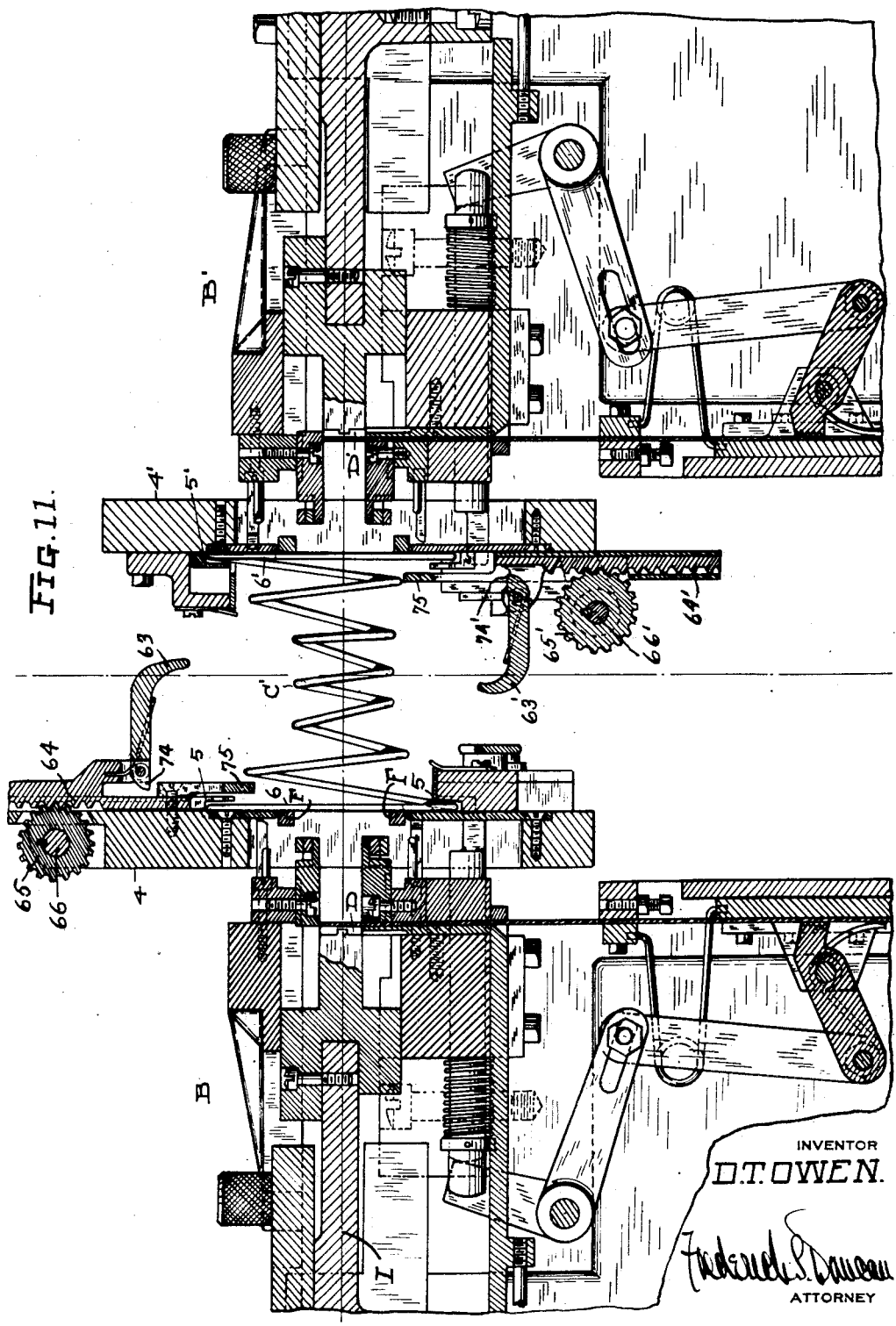
Fig. 11 is a sectional view corresponding to Fig. 9, showing the supporting plate for the springs moved nearer together and with the spring compressed therebetween and the opposite ends of the spring moved apart from the respective clipping devices, as occurs during feeding movements of the connected springs.

As shown, the springs are of the hour glass type having coils of gradually increasing diameter extending from the middle of the spring to each end thereof, and with end coils of the same diameter, see Figs. 9 and 11. Moreover, each end coil terminates in a free extremity, that is, the terminal portion 7 of each large end coil is not knotted or tied to the body of the same coil as customarily, but is free to flex in respect to all other parts of the spring, see Figs. 7 and 8. Furthermore, this apparatus is constructed to tie or connect the two free extremities of each spring to the corresponding end loops or coils of a second spring, and so on until a given number of springs are connected together in a straight row. To accomplish that result in a satisfactory manner all the springs must be cut and coiled to a uniform length and the free extremities of each spring must be placed very accurately in their proper clipping or tieing positions opposite the clipping dies D—D' in the two clipping machines B—B', respectively. The making of each spring and its transfer to the clipping machines must also be properly executed, and the operations of the three machines co-ordinated and timed very accurately, to permit a series of such springs to be connected together successively without breakage or malfunction.

Figure 2:
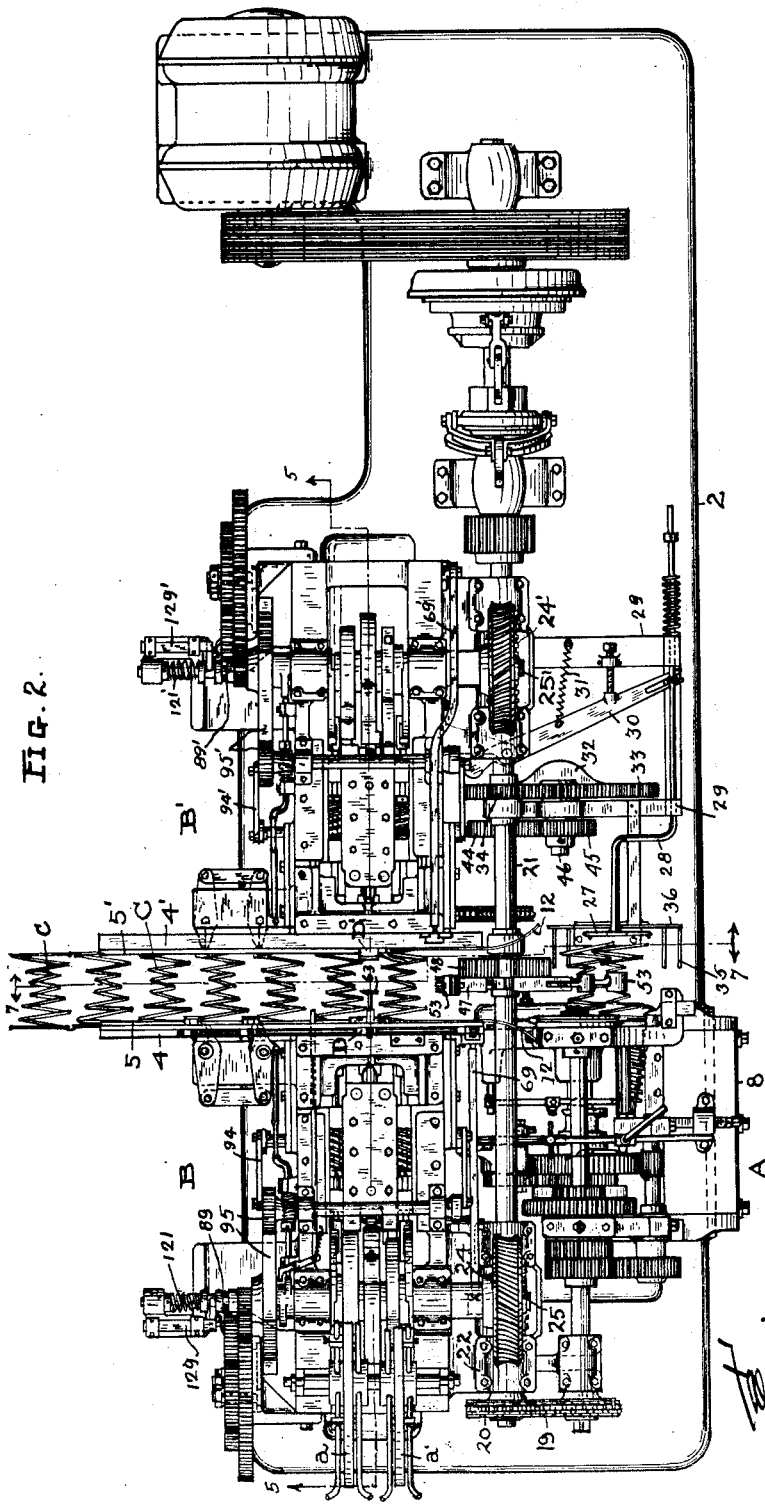
Fig. 2 is a plan or top view.
Figure 4:
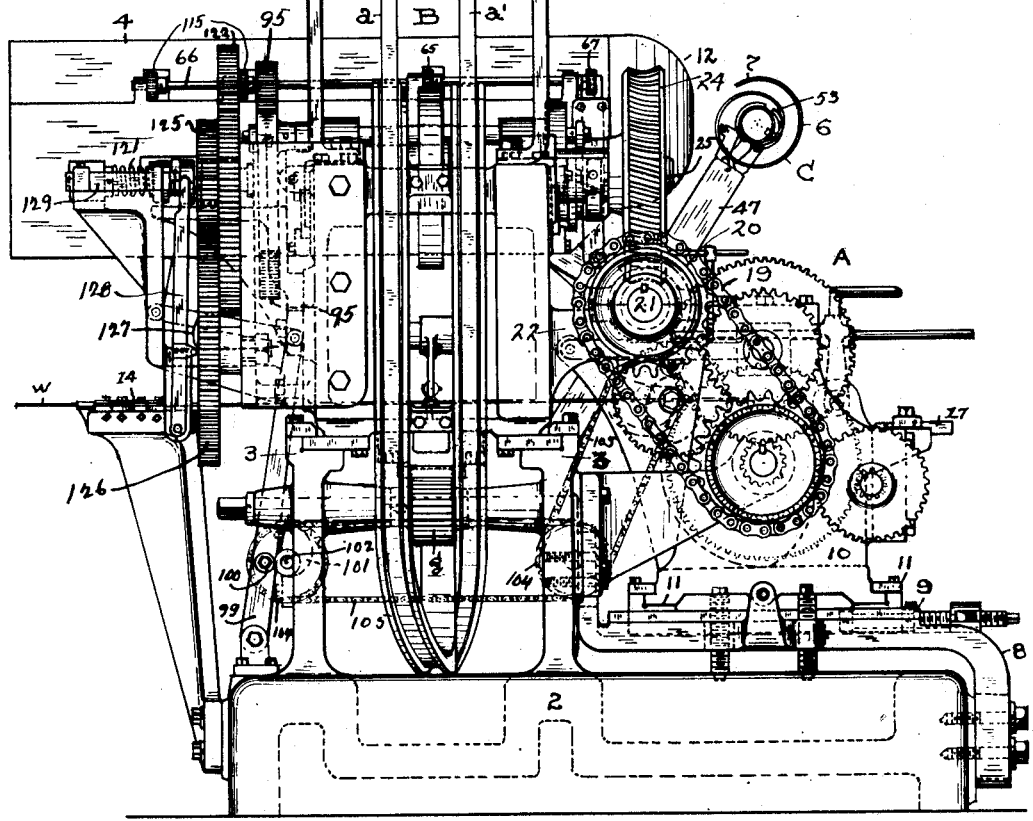
Fig. 4 is an end elevation of the apparatus slightly enlarged, as compared with the foregoing figures.

*The spring making machine A.*—This machine is mounted on bed plate 2 at one side of clipping machine B (see Fig. 4), and to facilitate the setting of this machine in respect to the clipping machines B and B', respectively, the mounting includes a vertically-adjustable base member 8, and a transversely-adjustable slide 9. The frame 10 of this machine is also supported to slide in guide ways 11 at the top of slide 9 so that this machine may be shifted lengthwise of the bed plate to place the spring coiling devices in the same vertical plane and directly in line with the passage between the two clipping machines where the completed springs may be transferred and delivered into the flaring entrance 12 of said passage, see Figs. 2 and 6.

I do not claim the spring making machine per se in this application, nor do I restrict myself to the use of the specific form of spring coiling machine disclosed herein. However, it is essential that the springs be coiled and cut with exactness and precision, and for that reason I prefer to use a spring coiling machine such as shown and described in my application for patent, Serial No. 305,620, filed Sept. 13, 1928. In that machine, and in the one delineated herein, a spring wire W is fed in a positive manner to spring coiling devices, and when a spring of given length is produced it is cut off automatically. The wire is drawn through a series of straightening rollers 14 by a pair of friction wheels 15—15 and forced to travel in a curved path around a set of forming rollers 16—16' opposite a cutter 17 (see Fig. 7), thereby producing a spirally coiled spring which is severed from the main wire when projecting horizontally a given distance beyond the coiling and cutting devices. Preferably, the spring is severed from the main wire when the terminal portion or free extremity 7 of the outer end coil 6' lies in the same vertical plane as the cutter, thereby producing a spring having both terminal portions on the same side of the spring. The spring is also coiled to a tapering form or hour glass shape by changing the working position of one roller, using an oscillatory arm 18 for that purpose. These devices and other operating parts in the machine are power driven, but inasmuch as machines of this kind are well known in the art, and also shown in my application for patent aforesaid, further description would be prolix. Suffice to say that the coiling machine A includes known mechanism driven intermittently by gearing, which in the present apparatus is operated by a sprocket chain 19 in mesh with a drive sprocket 20 fixed to a horizontal power shaft 21 revolving in boxes or bearings 22—22' at one side of the clipping machines B—B'. The mechanisms operated by these cam shafts feed separate strips $a$—$a'$ of clipping material to the clipping dies D—D', and these dies produce and attach separate clips simultaneously to opposite ends of the same spring and the corresponding ends of an adjoining spring. Preliminary to such clip producing and fastening operations, however, each spring C produced by coiling machine A is compressed to a shorter length and given a set and then conveyed bodily from the coiling machine to the passage way between the two clipping machines, where it is placed closely adjacent and parallel with another spring previously transferred thereto.

*The spring setting device.*—This device includes a cross-shaped plate 27 adapted to apply end pressure to each coiled spring C preliminary to its severance from wire W. Plate 27 is supported axially opposite the spring by a reciprocable rod 28 mounted to slide in brackets 29, and an oscillatory lever 30 controlled by a spring 31 is adapted to reciprocate said rod. Thus, the spring C is compressed when a cam 32 at one side of a spur gear 33 engages one end of pivoted lever 30 during rotatable movements of said gear and its drive pinion 34 on power shaft 21, see Fig. 2. Compression movements are brief and at this stage in the operations a set of parallel fingers or pins 35 extending from foldable arms 36 support and guide the coiled spring C. That is, the pivoted arms 36 are caused to swing toward each other to bring the fingers 35 into guiding engagement with the coiled spring, thereby holding said spring against buckling movement laterally while it is being compressed by plate 27. The means for swinging the arms 36 open and shut include a link 37 and a pair of pivotally connected levers 38 and 39, respectively, see Fig. 8. Lever 39 is pivotally supported between its ends upon an upright post 40, and its shorter end 41 engages a rotatable cam 42 on a countershaft 43 extending parallel with but beneath power shaft 21, see Fig. 8. Countershaft 43 carries a small spur gear 44 which is driven by a similar gear 45 on the short shaft 46 carrying the large gear 33 which is driven by pinion 34. Countershaft 43 is also utilized to operate other working parts of the apparatus, including a rotatable carrier or conveyor E for the compressed springs.

Figure 7:
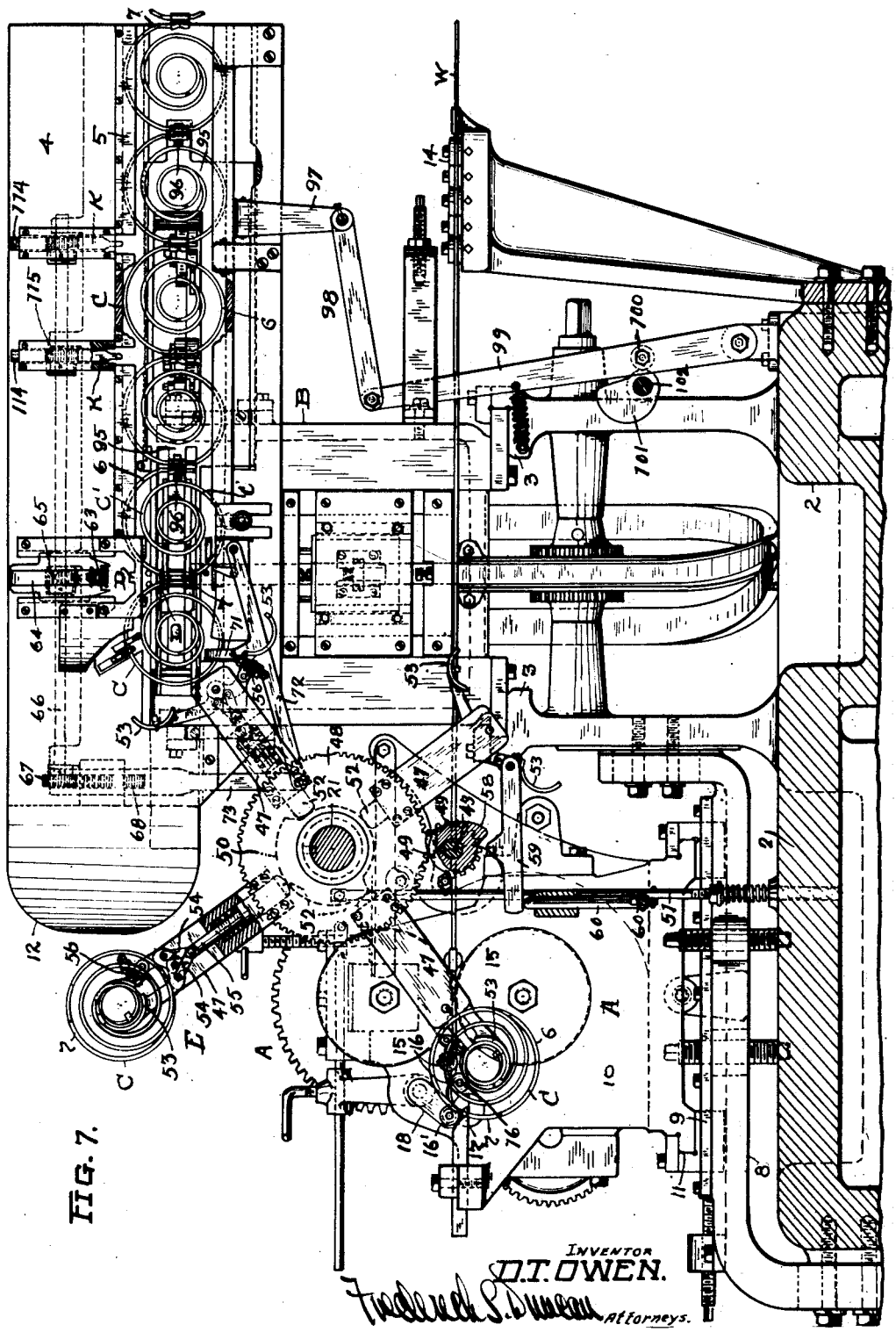
Fig. 7 is a view in cross section taken on the line 7—7 of Fig. 2, looking toward the left.

*The spring conveyor.*—This device is rotated at intermittent intervals and is mounted to turn freely on power shaft 21 opposite the entrance 12 of the passage between the two clipping machines B—B', see Fig. 7. It embodies a plurality of radial arms 47 fastened to a multilated gear 48 of the Geneva stop type adapted to be revolved intermittently by a smaller companion gear 49 fixed to countershaft 43. A cam 50 is sleeved on power shaft 21 at one side of gear 48, and this cam is adapted to be oscillated for an instant and at other times it is held stationary or prevented from revolving by a spring-pressed rod 51 extending upwardly from base 2, see Fig. 7. A series of reciprocable plungers 52 are carried by the radial arms 47 and pressed by springs against cam 50, and each plunger is moved outwardly during a part of its orbital travel around said cam. The reciprocal movements of the plungers 52 open and close duplicate pairs of spring gripping members 53 hinged to the outer extremities of each arm 47 and connected by links 54 to the stem 55 of each plunger. The grippers 53 are curved to embrace and hold the smaller middle coils of the spring, preferably after the spring has been compressed and set to length. One or both grippers 53 may also be jointed and provided with compression springs 56 at the joint (see Fig. 7) to permit the spring to be gripped without distorting the coils. Approximately one half of a revolution of the spring conveying device E will deliver and place a completed spring parallel with another spring confined at its ends within the channeled guides 5—5'. In this delivery movement the completed spring moves in an arc from the spring coiling and cutting devices and is reversed or inverted when introduced between the clipping dies D—D', thereby bringing the free terminal portions of the end coils of the spring in vertical alignment with both sets of clipping dies and closely adjacent the corresponding end coils of a similar spring previously delivered in the same place but shifted one step onward within the channeled guides 5—5'. The spring last delivered is held momentarily in line with the clipping dies until the end coils are clamped immovably, against the plates 4—4'. Then the grippers 53 are opened to release the spring and permit conveyor E to be rotated again without striking or disturbing that spring. Opening of the grippers 53 is therefore effected while the rotatable conveyor E is at a standstill, and is accomplished by depressing rod 51 to rotate cam 50 counter-clockwise until the plunger 52 for the gripper in question rides from a high to a low point on the cam, see Fig. 7. The depression of rod 51 is effected at given intervals by the revolution of countershaft 43 and a cam 58 thereon adapted to engage a pivoted arm 59 resting on a depressible bolt 60 which is connected to a second pivoted lever 61 having its free end attached to rod 51, see Figs. 1 and 7.

*The clamping devices.*—When a coiled spring C is delivered between the two clipping machines closely adjacent and parallel with a second spring C' previously delivered thereto, the end coils of both springs are jointly pressed and held immovably against the plates by a pair of pivoted clamping fingers 63—63' mounted on toothed racks 64—64', see Figs. 7 and 9. The clamping fingers 63—63' are vertically disposed on the longitudinal median line of the clipping machines, where they may swing in a vertical plane between the spring and engage the end coils of guides and are reciprocated by rotatable gears 65—65' fixed to shafts 66—66' which extend lengthwise of the channeled plates 4—4' and carry pinions 67—67' adapted to be rotated by a second set of reciprocable racks 68—68'. The latter are raised and lowered at intervals by rocker levers 69—69' situated at one side of the clipping machine opposite cams 70—70' on the main cam shafts 25—25', respectively, see Figs. 1 and 2. A set of auxiliary clamping fingers 71—71' may also be employed to engage and flatten the end coils of spring C after it is introduced between the channeled plates 4—4', and these auxiliary clamping fingers are adapted to be operated by levers 72—72' attached to projecting portions 73—73' of the racks 68—68', respectively, see Figs. 7 and 8.

The clamping fingers 63—63' have curved extremities and are pivoted and spring-controlled so that they extend at right angles to the plates 4—4' when not in clamping engagement with the spring. They are turned on their respective pivots and brought to bear against the end coils of the spring when the racks 68—68' are shifted toward the spring and the shorter inner ends 74—74' of the fingers strike stationary plates 75—75' screwed to the channeled plates 4—4', see Fig. 9. In that view note also, that the clamping of one end coil of the spring is effected from above the spring by finger 63, and the coil at the opposite end of the spring is engaged by finger 63' at a diagonally opposite point beneath the spring and that the operating parts for the fingers are correspondingly situated. In the main, however, the two clipping machines are substantially alike, and like parts are given like designating characters herein, with a prime mark added for the parts in machine B'.

*The clipping machines.*—These machines embody pivoted clutches 76—76' for feeding separate narrow metal strips *a—a'* at intermittent intervals upwardly through vertical passages at the rear of the plates 4—4' and past reciprocable cutter bars 77—77' which sever the strips transversely into narrow blanks *b—b'*, see Fig. 9. The strips push the severed blanks into the front ends of the folding dies D—D' which lie in the same horizontal plane as the axis of the spring, and the dies are then utilized to carry the blanks against the spring wires preliminary to folding them around the wires. Suitable mechanism for connecting two coiled springs together in that way, is shown and described in my application for Letters Patent filed on the 12th day of March, 1929, Serial No. 346,306, and reference may also be had to my application Serial No. 156,202, filed December 21, 1926, for a spring fabricating machine in which similar clipping mechanism is employed. The machines referred to are single machines having clipping dies arranged vertically therein to operate at one end only of a spring, whereas the present invention involves the use of two clipping machines arranged horizontally and operating in unison at opposite ends of the same spring.

Figure 6:
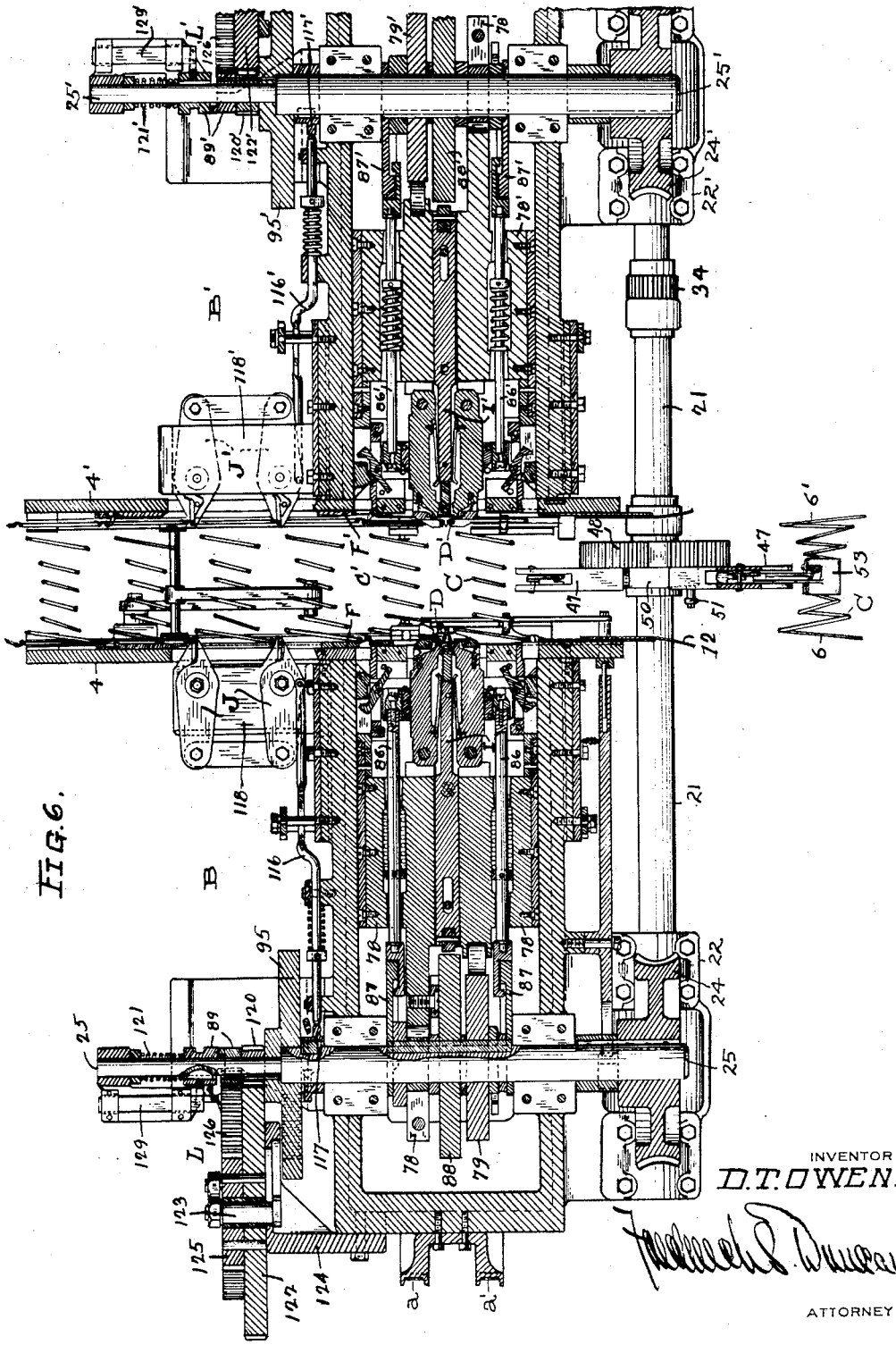
Fig. 6 is a horizontal section and plan view of the apparatus, the section being taken on the line 6—6 of Fig. 5.

Thus the present clipping machines B—B' comprise cross slides 78—78' to which separate sets of folding dies D—D' are pivotally connected, see Fig. 6, and these cross slides are reciprocated at intervals by cams 79—79' on the respective cam shafts 25—25' of the two clipping machines. When the cross slides move outwardly the outer ends of the dies pass through openings in the plates 4—4', and the clip blanks seated within the rabbeted outer ends of the dies are brought facially into contact with the adjoining wires of two springs. At this stage of the operations, the wires are slightly separated and clamped against the plates, and the clamping means include a set of slidable clamping holders 80—80' flanking the dies, see Figs. 12 and 17. Beveled extensions 81—81' fixed to the sides of cross slides 78—78' engage and press the holders 80—80' toward each other and over the wires when the cross slides are first moved outwardly, and pivoted dogs 82—82' reverse the movement of the holders 80—80' and release the wires when the cross slides are retired.

Figure 12:
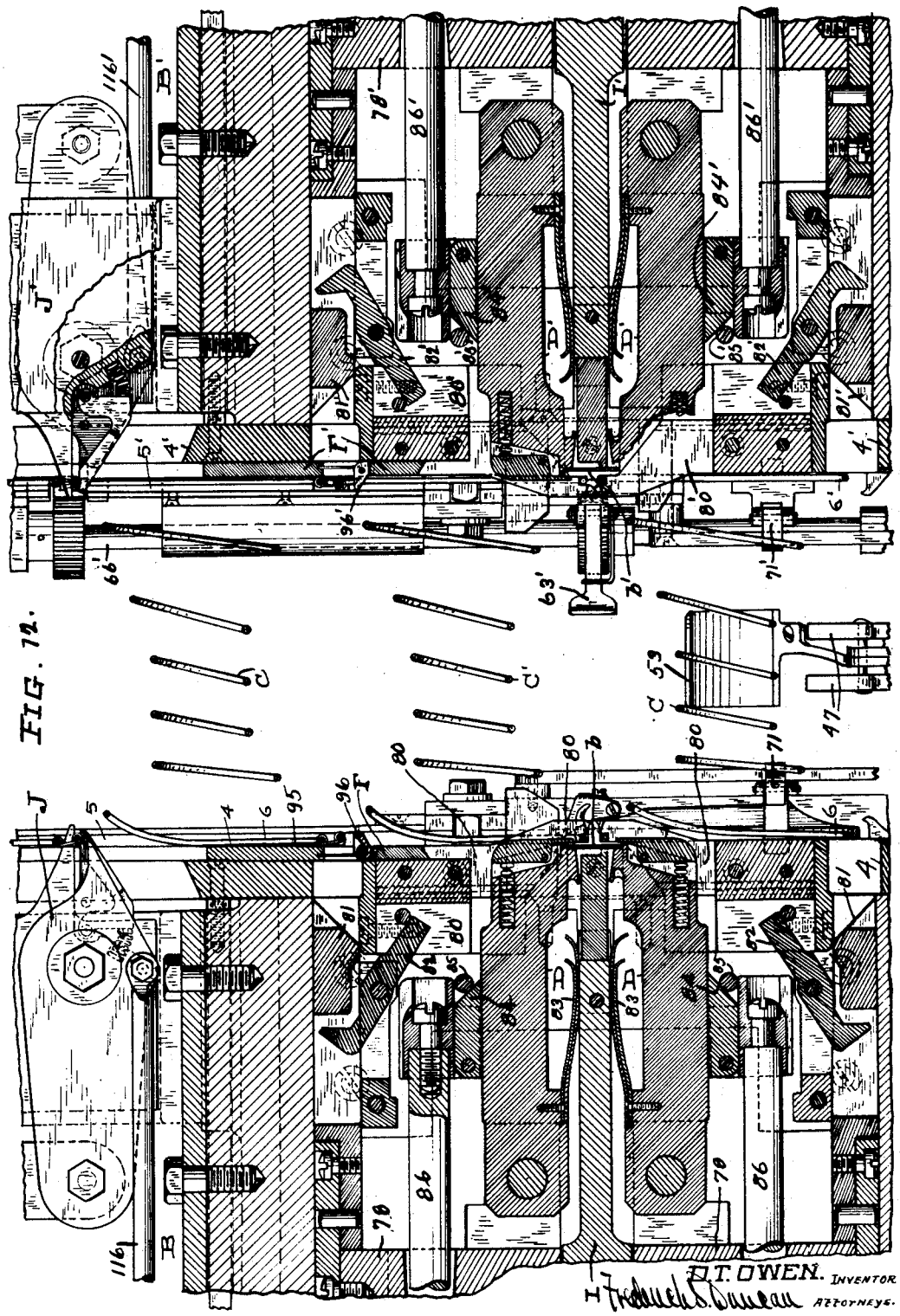
Fig. 12 is a horizontal section and plan view corresponding to Fig. 6, but showing only a central part thereof, and on a larger scale.

When the end coils of two springs are clamped between the two plates 4—4' as stated, the two sets of clipping dies carry the clip blank *b—b'* into engagement with the spaced wires substantially as shown in Fig. 12. The dies continue to move onward and in Fig. 13 the dies have advanced sufficiently to fold the end portions of the clip blank at right angles around the wires. The forward movement of the dies is then arrested and they are then tilted on their pivots to cause the extremities of the blank to be folded toward each other, see Fig. 14. In following this the dies are drawn inwardly a short distance to curl the folded ends of the blank around the wires, see Fig. 15. The dies carry flat springs 83 which normally press the respective members of each set apart, but during the curling operations the dies are pressed toward each other by beveled pawls 84 when these pawls are brought into contact with round stationary pins 85. The pawls are carried by reciprocable rods 86 extending through the cross slide and coupled to cams 87 on cam shafts 25—25', see Fig. 6.

Now, referring to Fig. 15, after the clip has been folded around the wires it is indented by a plunger I operated by a cam 88 on cam shaft 25. The cam also causes the plunger to follow the movement of the cross slide when the clip blank is carried into position by the dies. In Fig. 16, the dies are shown spread apart or open, a position assumed when a reverse movement is imparted to the rods 86 and pawls 84, thereby permitting the cross slide to return to starting position and the dies to be retired in respect to the face plates and the connected springs. In withdrawing or reversing the cross slide, the extension 81 tilts the pivoted dogs 82, thereby releasing the slidable clamping holders 80 from the wires, see Fig. 17.

The next step in operation involves a movement which frees the springs from all projecting parts on the respective working heads of the two clipping machines so that the connected springs may be fed onward a predetermined distance for the placement of another spring between the clipping dies. Thus, when clipping operations are over, the plates 4—4' are shifted horizontally toward each other, thereby compressing the springs and placing the end loops or coils thereof in other planes remote from the projecting parts on the working heads of the clipping machine, see Fig. 11. The clamping fingers 63—63' carried by the plates are also disengaged from the springs at this time so that the springs may be fed lengthwise of the channeled guide ways 5—5'.

Figure 1:
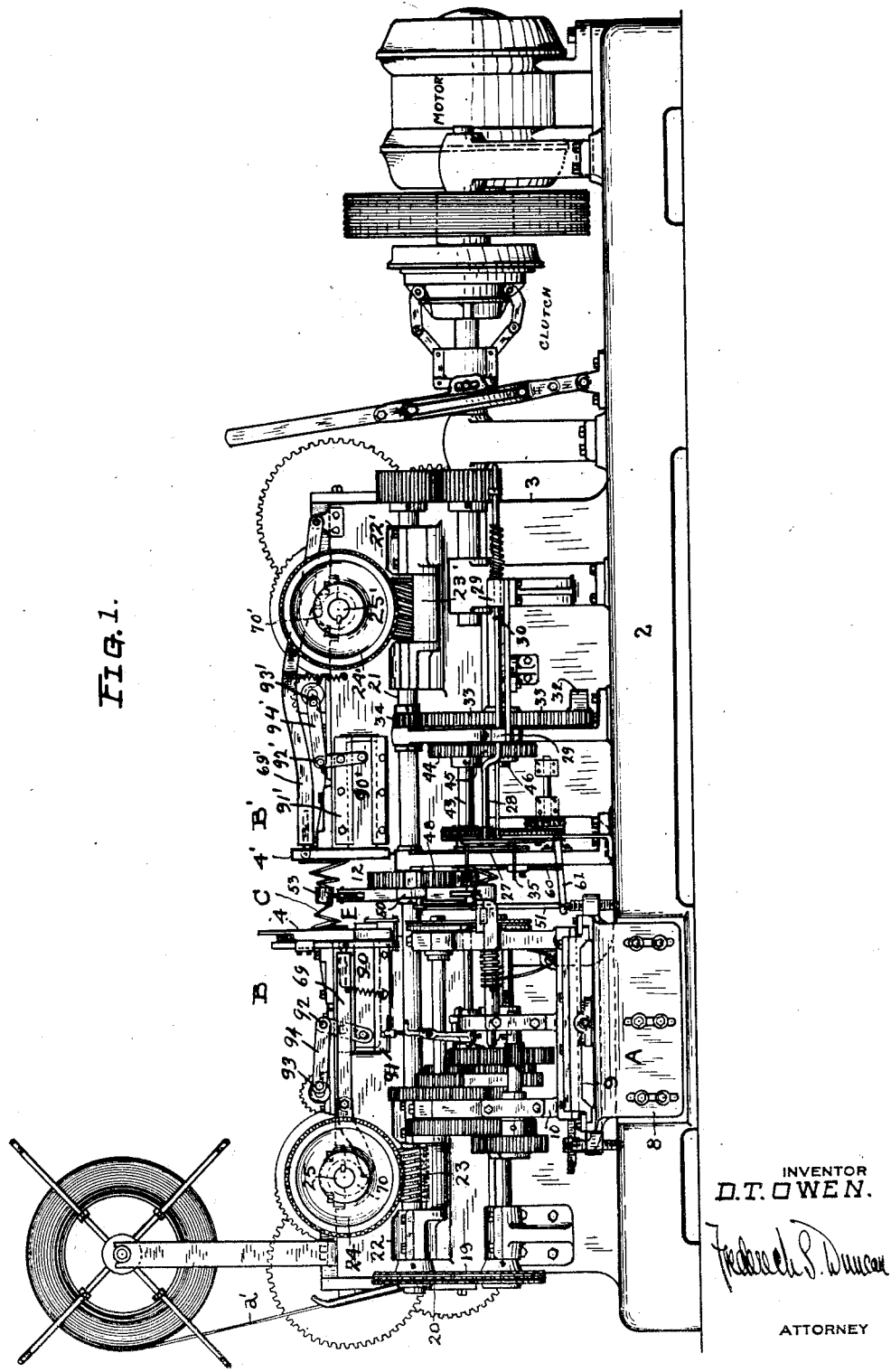
Figure 3:
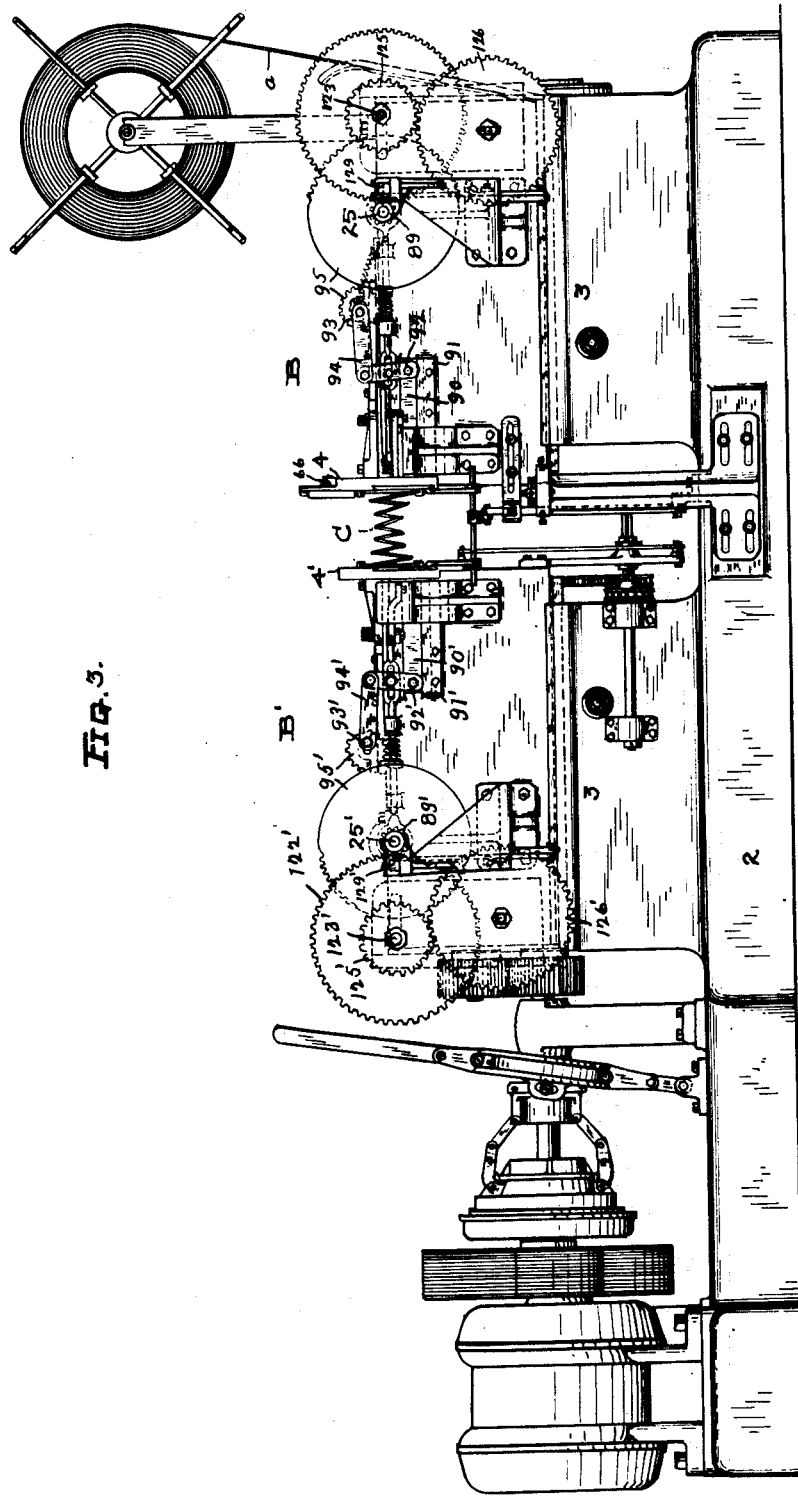
Fig. 3 is a side elevation of the opposite side of the apparatus shown in Fig. 1.

*The plate shifting devices.*—The guiding and supporting plates 4—4' for the springs are mounted upon reciprocable slides 90—90' secured by guide bars 91—91' to the sides of the machines B—B', see Fig. 1. Rocking levers 92—92' are connected to the slides, and these levers are oscillated at predetermined times by rotatable cranks or eccentrics 93—93' and links 94—94'. The cranks or eccentrics are driven by intermittent gears 95—95' deriving their power and motion from clutches 89—89' on the cam shafts 25—25', see Figs. 3 and 5.

*The spring feeding devices.*—After each clipping operation all of the springs which have been connected together are shifted in unison lengthwise of the channeled guide ways 5—5' while the plates 4—4' are stationed apart from the working heads of the clipping machines. The springs are under a certain degree of compression at this time which sets up some resistance to the movement of the end coils within the guide ways when the springs are fed forward therein. The springs are also easily twisted or distorted at this time, especially in a row of springs where the end coils are only connected at their free extremities as delineated in Fig. 7. Therefore, I prefer to use feeding means which will both push and pull the springs, and also re-align the end coils of the springs relatively to the feeding device should the springs become twisted or distorted. Thus, the laterally movable plates 4—4' support other plates or bars F—F' adapted to be reciprocated lengthwise of the guide ways 5—5', and these feed bars carry spring-pressed catches 96—96' adapted to engage the end coils of the springs where clipped together, see Fig. 12. The feed plates or bars F—F' have depending arms 97—97', see Figs. 7 and 8, which are connected by links 98—98' to an oscillatory lever 99 carrying a roller 100 which is engaged by a revolving cam 101 on a shaft 102, see Fig. 7. Shaft 102 is supported upon a bracket 103 depending from clipping machine B', see Fig. 8, and is driven from countershaft 43 by a set of sprocket gears 104 and sprocket chains 105. In Fig. 8, I also show a second cam 106 on revolving shaft 102, which cam is utilized to oscillate a second lever 107 connected to a sliding plate 108 having an inclined slot 109 therein. A pin 110 on a vertically-movable plunger 111 extends into slot 109, and the upper end 112 of this plunger is adapted to pass between two springs and engage the connecting clip $b'$ therefor, thereby aligning the clip with feed pawl 98' whenever the spring becomes distorted or twisted during feeding or clipping operations. The positioning of the connecting clip on the center line of the feed movement is also desired to promote subsequent trimming operations of the wire spring.

*The spring trimming devices.*—Each spring is of uniform length and the extreme end portions of the large coils at opposite ends of the spring overlap each other, viewing the spring from either end. The free end portions 7 of the coils may overlap more or less, all as predetermined when the spring is made and cut to a given length. Preferably, the spring is cut slightly oversize or longer than actually needed, that is, surplus stock is provided at the terminal portions or free ends of the spring so that these ends may always register with the clipping dies. As a result, the clip is usually attached a short distance back from the extreme end of the wire, and a short piece of wire will project beyond the clip. This piece is trimmed or sheared off by pivoted cutters J—J', two sets being employed in the line of feed movement of the springs, together with two sets of aligning plungers K—K', see Figs. 7 and 8. The aligning plungers K—K' are operated by racks 114—114' engaged by pinions 115—115' on the rotatable shafts 66—66', and the pivoted trimming shears J—J' are opened and closed by spring-pressed connecting rods 116—116' supported at one side of the clipping machines and actuated by cams 117—117' on the cam shafts 25—25', see Fig. 6. Two sets of trimming shears are mounted upon stationary brackets or arms 118—118' affixed to the frame of the clipping machines and these shears are open to receive the wires when the movable plates 4—4' are shifted apart to bring the end coils of the springs in substantially the same vertical plane as the cutting tips of the shears. Briefly stated, the plates 4—4' deposit the projecting spring ends into the shears when the plates are moved to a rest position against the heads of the clipping machine, and two sets of shears are used as the present apparatus is designed to clip a given number of springs together, and then skip a clipping operation without interrupting coiling and feeding operations.

No clip will be formed in the absence of the wires, and therefore it is only necessary to keep the spring coils away from the clipping dies whenever a clipping operation is to be avoided. Thus, after a given number of springs have been produced and clipped together, the movable plates 4—4' are shifted toward each other and held in that position during a clipping operation, thereby keeping the end coils 6—6' of two adjoining springs apart from the clipping dies during that operation. This result is obtained by throwing out the clutches 89—89' on the cam shafts 25—25' and may be effected after revolving the cam shaft any given number of times by using a set of interchangeable gears L to drive the intermittent gears 95—95'.

Thus, referring to Figs. 2 to 6 inclusive, note that the large mutilated gear 95 is free to revolve on the cam shaft and has a pinion 120 and one member of clutch 89 pinned thereto. The other member of the clutch is keyed to the cam shaft, see Fig. 6, and a coiled compression spring 121 holds the clutch members normally in clutching engagement. Consequently, each revolution of the cam shaft will operate the plates 4—4' until the clutch 89 is thrown out or disengaged. To throw out the clutch, the pinion 120 affixed to gear 95 drives a spur gear 122 mounted on a stud shaft 123 at one side of a bracket 124. A smaller gear 125 fixed to gear 122 rotates a second large gear 126 having a cam lug 127 at one side thereof. After a given number of operating cycles of the clipping machines, the lug 127 engages a pivoted lever 128 which actuates a throw-out latch 129 for clutch 89, thereby stopping the revolution of intermittent gear 95 and holding the guide plates 4—4' stationary with the springs compressed and apart from the clipping dies during one revolution of the cam shafts or while the clipping machines are operating idly.

All the connecting springs in the row are compressed between the two plates 4—4' when the aforesaid skipping operations occur, and consequently no trimming of the wires takes places during that period of operations. Therefore, two sets of trimming shears are employed in tandem to trim the wires, the second set coming into action on the untrimmed spring after it has escaped the first set of trimming shears.

What I claim is:

1. In an apparatus for producing spring structures, corresponding spring holding and spring uniting devices situated opposite each other, and means for operating said devices in unison to join the opposite ends of a coiled spring to the corresponding ends of other coiled springs.

2. In an apparatus for producing spring wire structures, a plurality of clip folding machines situated oppositely in spaced relation, and means for operating said machines in unison to fold metal clips around the wires at opposite ends of a coiled spring and the corresponding ends of other coiled springs.

3. In an apparatus for producing spring structures, a pair of spring-connecting machines having parallel guide-ways adapted to support the opposite ends of a coiled spring for feed movement between said machines.

4. In an apparatus for producing spring structures, a pair of clip folding machines, parallel guide plates between said machines adapted to support the opposite ends of a plural number of coiled springs, and reciprocable feed members for shifting said springs lengthwise between said plates.

5. In an apparatus for producing spring structures, a pair of spring-connecting machines having working heads arranged in spaced relation, and means for seating the opposite ends of a coiled spring against said heads.

6. In an apparatus for producing spring structures, a pair of horizontally-disposed clipping machines having vertical working heads arranged in spaced relation, channeled plates between said heads for seating the opposite ends of a plural number of coiled springs opposite said heads, and reciprocable feeding devices operating lengthwise of each plate engageable with said springs.

7. In an apparatus for producing spring structures, a pair of spring-connecting machines having relatively movable means for supporting the opposite ends of a coiled spring.

8. In an apparatus for producing spring structures, a pair of clipping machines having parallel channeled plates spaced apart for supporting the opposite ends of a series of coiled springs therebetween, means for moving said plates toward each other to compress the springs, and means for feeding the springs along said plates when under compression.

9. In an apparatus for producing spring structures, a pair of spring-connecting machines spaced apart to receive coiled springs between them, including means for clamping the corresponding coils at both ends of two springs in stationary positions opposite said machines.

10. In an apparatus for producing spring structures, a pair of clipping machines having parallel guide-ways spaced apart to receive coiled springs between them, means supported upon said plates for clamping the end coils of two springs temporarily within said guide-ways, and supplemental clamping devices within said clipping machines for holding the end coils during clipping operations.

11. In an apparatus for producing spring structures, a pair of oppositely-disposed spring-connecting machines for supporting the opposite ends of a coiled spring between said machines, and means for shifting the spring upon said supporting means.

12. In an apparatus for producing spring structures, a pair of oppositely-disposed clipping machines, each having means for supporting and holding one end of a coiled spring thereon, and means for positively shifting each end of the spring upon its respective supporting means.

13. In an apparatus for producing spring structures, a pair of machines having parallel guide-ways for the opposite ends of a coiled spring, including means in line with each guide-way for attaching the end coils of one spring to the corresponding end coils of a second spring.

14. In an apparatus for producing spring structures, a pair of clipping machines having parallel guide-ways for the opposite ends of a coiled spring, means on the median line of each guide-way for attaching the end coils of one spring to the corresponding end coils of a second spring, and means at spaced intervals longitudinally of said guide-ways for shifting the connected springs in unison thereover.

15. In an apparatus for producing spring structures, a pair of spaced machines for connecting the opposite ends of a coiled spring to the corresponding ends of a second coiled spring, and means for delivering and stationing coiled springs intermediate said machines.

16. In an apparatus for producing spring structures, a pair of clip feeding machines arranged end to end and including means for connecting the opposite ends of a coiled spring to the corresponding ends of a second spring, and means for delivering and stationing coiled springs singly and successively in alignment with the connecting means in both of said machines.

17. In an apparatus for producing spring structures, co-operatively associated devices for connecting the opposite ends of a coiled spring to the corresponding ends of a second coiled spring, means for delivering coiled springs intermittently to said devices, and means for shifting the connected springs.

18. In an apparatus for producing spring structures, two clip forming machines embodying corresponding devices for connecting the opposite ends of a coiled spring to the corresponding ends of a second coiled spring by the clips formed in said machines, means for placing coiled springs between said devices, and means for displacing the connected springs.

19. In an apparatus for producing spring structures, associated devices for connecting the opposite ends of a coiled spring to the corresponding ends of a second coiled spring, and means for accurately positioning the corresponding ends of the coiled springs opposite their respective connecting devices.

20. In an apparatus for producing spring structures, a set of corresponding clip folding machines arranged to connect the opposite ends of a coiled spring to the corresponding ends of a second coiled spring, and means in each of said machines for accurately positioning the corresponding ends of the coiled springs opposite their respective connecting devices.

21. In an apparatus for producing spring structures, separated mechanisms for fastening the opposite ends of a coiled spring to the corresponding ends of a second spring, and means for aligning said springs parallelly between said mechanisms.

22. In an apparatus for producing spring structures, a pair of corresponding machines arranged oppositely embodying means for fastening the opposite ends of a coiled spring to the corresponding ends of a second spring, and means in each of said machines for clamping the corresponding end coils of said springs closely adjacent each other and said fastening machines.

23. In an apparatus for producing spring structures, a set of opposed devices for connecting the opposite ends of a coiled spring to the corresponding ends of other springs, means for delivering coiled springs singly and successively between said devices, and means for correcting distorted alignment of the springs relatively to said connecting devices.

24. In an apparatus for producing spring structures, a set of clip folding devices arranged to connect the opposite ends of a coiled spring to the corresponding ends of other springs, a conveyor adapted to seat the opposite ends of the coiled springs opposite their respective connecting devices, and means for correcting misplacement of the opposite ends of the conveyed springs relatively to said connecting devices.

25. In an apparatus for producing spring structures, a set of spaced connecting devices for uniting the opposite ends of a coiled spring to the corresponding ends of other springs, means for placing the corresponding ends of the spring in definitely fixed relations, and means for clamping the said ends fixedly in position preliminary to uniting them together.

26. In an apparatus for producing spring structures, a set of clip folding and connecting devices arranged to operate on the opposite ends of a coiled spring and the corresponding ends of other springs, means for conveying coiled springs singly and successively to said devices with their opposite ends adjacent the corresponding ends of a spring previously delivered thereto, and means for clamping the said corresponding ends fixedly in position preliminary to uniting them together.

27. In an apparatus for producing spring structures, separate spring-connecting devices having a passage way between them for the springs, and shiftable supporting means for the springs located in said passage way adapted to alternately seat and unseat the opposite ends of the springs in respect to said connecting devices.

28. In an apparatus for producing spring structures, a pair of clip folding and connecting machines having a channeled passageway between them adapted to seat the opposite end coils of a series of coiled springs, and intermittently-operated means adapted to seat and unseat the opposite ends of the springs in respect to said connecting devices.

29. In an apparatus for producing spring structures, separate spring-connecting devices spaced apart, including a pair of relatively movable members for contracting the springs and moving the opposite ends thereof apart from said connecting devices.

30. In an apparatus for producing spring structures, a pair of clip folding machines arranged to operate on the opposite ends of a plurality of coiled springs, including means for contracting the springs to separate the opposite ends thereof from said connecting devices.

31. In an apparatus for producing spring structures, a pair of opposed spring-connecting devices, relatively movable guides for the springs located between said connecting devices adapted to compress the springs, and means for feeding the springs between said guide-ways when compressed.

32. In an apparatus for producing spring structures, a pair of spring-connecting machines arranged to operate on the opposite ends of coiled springs, means interposed between said machines adapted to compress the springs, and means for feeding the springs between said machines.

33. In an apparatus for producing spring structures, a pair of opposed devices for connecting the opposite ends of a coiled spring to the corresponding ends of other coiled springs, parallel channeled members mounted to move back and forth relatively to said connecting devices, and means for feeding the connected spring lengthwise between said members at intermittent intervals.

34. In an apparatus for producing spring structures, a set of spring-clipping machines arranged to connect the opposite ends of a coiled spring to the corresponding ends of other coiled springs, channeled seats for the spring ends movable relatively to said connecting devices, and means for engaging and shifting the ends of said springs lengthwise within said seats subsequent to each connecting operation.

35. In an apparatus for producing spring structures, oppositely situated devices for connecting the opposite ends of a coiled spring to the corresponding ends of other coiled springs, and means for trimming the extremities of the connected ends of said springs.

36. In an apparatus for producing spring structures, means for connecting the end coil of a coiled spring to the corresponding end of another coiled spring, and means for trimming the terminal portion of the connecting coil of one of said springs.

37. In an apparatus for producing spring structures, opposed devices for connecting the opposite ends of a coiled spring to the corresponding ends of other springs, means for trimming the extremities of each spring, and means for aligning said extremities with said trimming means.

38. In an apparatus for producing spring structures, associated devices for connecting the free end of a coiled spring to the corresponding end of another coiled spring, and means for trimming the extremity of each free end closely to the point of connection.

39. In an apparatus for producing spring structures, a pair of clipping machines spaced apart and provided with means for placing coiled springs singly and successively in parallel alignment between said machines, and means for feeding the connected springs at intermittent intervals transversely of said machines.

40. In an apparatus for producing spring structures, separate clip folding devices arranged to operate on the opposite ends of coiled springs, means for feeding coiled springs parallelly between said devices, and means for separating the opposite ends of the springs from the clip folding devices preliminary to feeding operations.

41. In an apparatus for producing spring structures, a pair of machines for connecting the opposite ends of a coiled spring to the corresponding ends of other coiled springs, said machines having working heads spaced apart and relatively movable to permit operations on coiled springs of different length.

42. In an apparatus for producing spring structures, a pair of clip folding machines arranged to connect the opposite ends of a coiled spring to the corresponding ends of other coiled springs, said machines being spaced apart adjustably to permit operations on coiled springs of different length.

43. In an apparatus for producing spring structures, oppositely related devices for connecting the opposite ends of a coiled spring to the corresponding ends of other springs, including means for supporting the opposite ends of the springs movably opposite the said devices, and means for engaging and shifting both ends of the springs simultaneously over said supporting means.

44. In an apparatus for producing spring structures, a pair of clip folding machines arranged to connect the opposite ends of a coiled spring to the corresponding ends of other springs, each machine having means for supporting the corresponding end of the springs in alignment with said devices, and means for engaging and shifting both ends of the springs simultaneously between said machines.

45. In an apparatus for producing spring structures, separate devices for connecting the opposite ends of coiled springs to the corresponding ends of other coiled springs to produce a row of springs, including means for feeding springs between said devices and means for withholding the opposite ends of the springs from said devices following a predetermined number of connecting operations.

46. In an apparatus for producing spring structures, a pair of clip folding machines arranged to connect the opposite ends of coiled springs to the corresponding ends of other coiled springs to produce a row of springs, including means for introducing coiled springs singly and successively between said devices, and means for withholding the opposite ends of the springs from said devices following a predetermined number of connecting operations.

47. In an apparatus for producing spring structures, a pair of clipping machines, means for conveying coiled springs singly and successively to both machines, means for seating the opposite ends of each spring in connecting position opposite said machines.

48. In an apparatus for producing spring structures, a pair of clipping machines, means for conveying coiled springs singly and successively to both machines, means for clamping the opposite ends of each spring in connecting position opposite said machines, and feeding devices engageable with the opposite ends of the clipped springs.

49. In an apparatus for producing spring structures, a pair of clipping machines, means for conveying coiled springs singly and successively to both machines, means for holding the opposite ends of each spring in a connecting position opposite the corresponding ends of a second spring, and means for producing a succession of clipping operations and then a skip in such operations.

50. In an apparatus for producing spring structures, means for connecting the corresponding ends of a series of coiled springs together, and means for conveying coiled springs to said connecting means, including grippers adapted to grasp the springs intermediate their respective ends.

51. In an apparatus for producing spring structures, a pair of clipping machines arranged to connect the opposite ends of a coiled spring to the corresponding ends of other coiled springs, and a delivery device arranged adjacent said machines adapted to grasp and hold the springs between the opposite ends thereof.

52. In an apparatus for producing spring structures, mechanism for connecting the corresponding ends of a plurality of coiled springs together, and a delivery conveyor for the springs having grippers adapted to enfold and firmly hold the central coils of the springs.

53. In an apparatus for producing spring structures, separate clip folding machines for connecting the opposite ends of a coiled spring to the corresponding ends of other coiled springs, and a conveyor for the springs adapted to grip and firmly hold the central coils of the springs.

54. In an apparatus for producing spring structures, spring connecting devices, and a delivery conveyor for the springs having means for gripping the spring intermediate the ends thereof and adapted to deposit the springs between said connecting devices.

55. In an apparatus for producing spring structures, separate spring-connecting devices arranged in spaced relation, and means for delivering coiled springs between said devices, including means for gripping the spring apart from the end coils thereof to permit the said end coils to be freely deposited between said connecting devices.

56. In an apparatus for producing spring structures, cooperating devices for connecting the opposite ends of a coiled spring to the corresponding ends of other springs, a machine for producing coiled springs, and means for conveying the coiled springs singly and successively from said machine to and between said spring connecting devices.

57. In an apparatus for producing spring structures, a pair of clip folding machines arranged to connect the opposite ends of a coiled spring to the corresponding ends of other coiled springs, a machine for producing coiled springs, and means for conveying the coiled springs singly and successively from said spring producing machine to and between said clip folding machines.

58. In an apparatus for producing spring structures, a pair of connecting machines adapted to connect a pair of coil springs together, a spring coiling machine, and delivery means adapted to grip the coiled springs between their opposite ends for placement between said connecting machines.

59. In an apparatus for producing spring structures, separate clip folding machines arranged to operate on opposite ends of coiled springs, a machine for coiling and producing springs singly and successively, and a conveyor having means to grip each coiled spring when produced between its opposite ends and to deposit the same between said clip folding machines.

60. In an apparatus for producing spring structures, two spring connecting machines having working heads spaced apart, a machine for making coiled springs, and a rotary conveyor adjacent said machine having grippers for delivering the coiled springs singly and successively between said working heads.

61. In an apparatus for producing spring structures, separate clip folding machines mounted in adjustably spaced relation, a machine for making coiled springs mounted adjacent said machines, and means for conveying the springs produced by the coiling machines to said clip folding machines jointly.

62. In an apparatus for producing spring structures, two machines adapted to connect a pair of coil springs together, means for supporting coiled springs intermediate said machines, a spring coiling machine, and means for conveying the springs from the coiling machine to said supporting means.

63. In an apparatus for producing spring structures, a pair of clip folding machines having parallel guides for supporting a series of coiled springs for movement therebetween, means for producing coiled springs opposite said guides, and means for receiving each finished spring and placing the opposite end coils thereof within said respective guides.

64. In an apparatus for producing spring structures, two spring connecting machines, channeled guide-ways between said machines for presenting the opposite ends of coiled springs to said machines, a machine for making coiled springs, and means for gripping the coiled springs between the ends thereof and for delivering the springs into said channeled guide-ways.

65. In an apparatus for producing spring structures, corresponding clipping machines spaced apart and having relatively movable means for seating the opposite ends of a row of coiled springs, means for delivering the coiled springs into said seating means, and means for producing coiled springs and depositing the same into said delivery means.

66. In an apparatus for producing spring structures, a pair of spring connecting machines, means for feeding springs transversely between said machines, a machine for making coiled springs, and means for transferring coiled springs from the latter machine to said feeding means between said connecting machines.

67. In an apparatus for producing spring structures, a pair of clip folding machines, means for feeding springs transversely between said machines, means for delivering coiled springs to said machines and feeding means, and means for producing coiled springs and depositing each spring as produced into said delivery means.

68. In an apparatus for producing spring structures, a pair of spring connecting machines having relatively movable guide plates for supporting the opposite ends of coiled springs therebetween, a machine for making coiled springs, and means for transferring coiled springs from the latter machine to and between said guide plates.

69. In an apparatus for producing spring structures, a pair of clip folding devices, parallel guide plates spaced apart to support the opposite ends of coiled springs for movement between said devices, means for clamping the opposite ends of a pair of coiled springs fixedly in line with said devices, means for delivering coiled springs singly and successively between said guide plates, and means for producing and depositing coiled springs into said delivery means.

70. In an apparatus for producing spring structures, spring connecting means, spring coiling means, a device for foreshortening and setting the coiled springs, and means for delivering the set springs to said spring connecting means.

71. In an apparatus for producing spring structures, a pair of spring connecting machines spaced apart to operate on the opposite ends of coiled springs, a machine for making coiled springs of greater length than the working space between said devices, means for transferring coiled springs from the last named machine to the pair of spring connecting machines, and means for compressing the springs to a shorter length preliminary to transferring them as stated.

72. In an apparatus for producing spring structures, means for connecting coiled springs together in a row, a machine for making coiled springs, means for compressing and giving each spring a set, and means for gripping the coiled springs at their middle and delivering them to said connecting means.

73. In an apparatus for producing spring structures, a pair of corresponding clip folding machines arranged to connect a series of coiled springs together in a row, a machine for making coiled springs, means for compressing and giving each spring a set after it has been produced, and means for gripping the set springs at their middle and delivering them singly and successively to and between said clip folding machines.

74. In an apparatus for producing spring structures, a pair of clip folding machines, and a spring coiling machine mounted adjustably in respect to both of said machines.

75. In an apparatus for producing spring structures, a pair of machines for connecting one coil spring to another, said machine being adjustably related to permit operations on the opposite ends of springs of different length.

76. In an apparatus for producing spring structures, a pair of clip folding machines slidably mounted end to end to permit operations on the opposite ends of springs of different length.

77. In an apparatus for producing spring structures, a pair of spring connecting machines mounted in adjustably spaced relation, a spring coiling machine adjustably disposed in respect to said connecting machines, and means for delivering springs from said coiling machine to and between said pair of spring connecting machines.

78. In an apparatus for producing spring structures, a pair of clip folding machines arranged end to end in adjustable spaced relation, a spring coiling machine mounted adjustably in respect to said clip folding machines, and a conveyor for delivering the finished springs from said coiling machine to and between said clip folding machines.

79. In an apparatus for producing spring structures, a pair of spring clipping machines supported end for end in spaced relation, and relatively movable to vary the working space between them, and means for delivering and feeding coiled springs between said machines.

80. In an apparatus for producing spring structures, a pair of horizontally arranged clipping machines disposed end for end in spaced relation, spring coiling mechanism mounted adjacent said machines opposite the space therebetween, and means for depositing the coiled springs horizontally between said clipping machines.

81. In an apparatus for producing spring structures, a pair of spring clipping machines, having a contractible passage therebetween for holding coiled springs, means for depositing coiled springs singly and successively into said passage, and means for feeding the connected springs lengthwise of said passage at intermediate intervals.

82. In an apparatus for producing spring structures, a pair of spaced clipping machines adapted to operate on the opposite ends of coiled springs fed between said machines, a rotatable conveyor having gripping devices for holding the coiled springs intermediate said clipping machines, and means for opening each gripping device after the spring held thereby has been deposited and secured at its ends within said clipping machines.

83. In an apparatus for producing spring structures, separate clipping devices for securing the opposite ends of a coiled spring to the corresponding ends of other springs, means associated with each clipping device for clamping the end of a coiled spring immovably in respect thereto, and means for depositing coiled springs singly and successively between said clipping devices, including means for holding each spring temporarily in a stationary position until said clamping means is activated.

84. In an apparatus for producing spring structures, spaced devices for connecting the opposite ends of a coiled spring to the corresponding ends of other springs, means for delivering a coiled spring intermediate said devices parallel with a second spring, means for clamping the corresponding ends of two springs opposite said devices, and reciprocatory means opposite each of said devices, engageable with the opposite ends of the connected springs for feeding said springs onward.

85. In an apparatus for producing spring structures, a machine for making coiled springs having free terminal portions at opposite ends thereof; a pair of machines having spring connecting devices spaced apart to operate on the opposite ends of said coiled springs; means for transferring the springs singly and successively from said coiling machine to said connecting machines; and means for clamping the terminal portions of each spring opposite said connecting devices when delivered adjacent the end coil of a second spring.

86. In an apparatus for producing spring structures, means for connecting the free terminal portions of a coiled spring to the corresponding end coil of a second spring, and means for clamping said free terminal portion of one spring and the end coil of the second spring temporarily in the same plane opposite said connecting means.

87. In an apparatus for producing spring structures, separate devices for connecting the free terminal portions at the opposite ends of a coiled spring to the corresponding end coils of a second coiled spring, and means adjacent each of said connecting devices for holding said terminal portions and the adjacent end coils in definitely fixed stationary positions preliminary to connecting them together.

88. In an apparatus for producing spring structures, separate connecting devices adapted to connect the free terminal portions at the opposite ends of a coiled spring to other parts in the same structure, means for delivering coiled springs to said connecting devices, and means for fixing the free terminal portions in predetermined positions opposite said parts and said connecting devices.

In testimony whereof, I have signed this specification.

DAVID T. OWEN.